(12) United States Patent
Quinn et al.

(10) Patent No.: US 10,385,939 B2
(45) Date of Patent: Aug. 20, 2019

(54) SPRING ASSEMBLY WITH A PROTECTED ATTACHMENT SITE

(71) Applicant: General Kinematics Corporation, Crystal Lake, IL (US)

(72) Inventors: Kerry William Quinn, Palatine, IL (US); Ed Steffes, Jr., Woodstock, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 0 days.

(21) Appl. No.: 15/879,072

(22) Filed: Jan. 24, 2018

(65) Prior Publication Data

US 2018/0245650 A1    Aug. 30, 2018

Related U.S. Application Data

(60) Provisional application No. 62/463,574, filed on Feb. 24, 2017.

(51) Int. Cl.
| B07B 1/30 | (2006.01) |
| B07B 1/36 | (2006.01) |
| F16F 1/12 | (2006.01) |
| B65G 27/04 | (2006.01) |

(Continued)

(52) U.S. Cl.
CPC .............. *F16F 1/122* (2013.01); *B65G 27/26* (2013.01); *F16F 1/126* (2013.01); *B07B 1/30* (2013.01); *B07B 1/36* (2013.01); *B65G 27/04* (2013.01); *B65G 27/20* (2013.01);

(Continued)

(58) Field of Classification Search
CPC ........ F16F 1/126; F16F 1/122; F16F 2230/10; F16F 2230/0005; F16F 2238/026; F16F 1/024; F16F 1/046; F16F 1/125; F16F 1/123; B65G 27/26; B65G 27/20; B65G 27/04; B65G 27/08; B07B 1/30; B07B 1/36

See application file for complete search history.

(56) References Cited

U.S. PATENT DOCUMENTS

| 3,169,757 A | 2/1965 | Roder et al. |
| 3,848,343 A | 11/1974 | Musschoot |

(Continued)

FOREIGN PATENT DOCUMENTS

| DE | 1943185 | 7/1966 |
| DE | 19829463 | 1/2000 |
| EP | 0264276 | 4/1988 |

OTHER PUBLICATIONS

Extended European Search Report and Opinion, counterpart EP Appl. No. 18158124, dated Jul. 23, 2018 (8 pages).

Primary Examiner — Mark A Deuble
(74) Attorney, Agent, or Firm — Cook Alex Ltd.

(57) ABSTRACT

A spring assembly includes a coil spring having one or more helical coils between two longitudinally spaced ends, and an attachment site disposed at at least one of the longitudinally spaced ends. The attachment site includes a casing enclosing the at least one of the longitudinally spaced ends, the casing having a casing passage therethrough between a first side and a second side. The attachment site also includes a washer disposed on the first side and having a washer passage aligned with the casing passage, and a base disposed on the second side and having a base passage aligned with the casing passage.

23 Claims, 4 Drawing Sheets

(51) Int. Cl.
  *B65G 27/20*  (2006.01)
  *B65G 27/26*  (2006.01)

(52) U.S. Cl.
  CPC ... *F16F 2230/0005* (2013.01); *F16F 2230/10* (2013.01); *F16F 2238/026* (2013.01)

(56) References Cited

U.S. PATENT DOCUMENTS

| | | | |
|---|---|---|---|
| 4,017,060 A * | 4/1977 | Brander | B06B 1/16 366/115 |
| 4,360,197 A * | 11/1982 | Palmer | A63B 5/08 267/286 |
| 4,565,279 A | 1/1986 | Musschoot | |
| 4,617,832 A | 10/1986 | Musschoot | |
| 5,178,259 A | 1/1993 | Musschoot | |
| 5,669,711 A | 9/1997 | Spence, III et al. | |
| 6,702,102 B2 | 3/2004 | Kraus et al. | |
| 7,069,686 B1 * | 7/2006 | Tamian | A01K 91/04 43/42.72 |
| 7,568,682 B2 * | 8/2009 | Seelmann | E01F 8/0023 267/170 |
| 8,528,189 B1 | 9/2013 | Smith et al. | |
| 8,998,043 B2 | 4/2015 | Fruit et al. | |
| 2007/0125624 A1 | 6/2007 | Massman | |

* cited by examiner

US 10,385,939 B2

SPRING ASSEMBLY WITH A PROTECTED ATTACHMENT SITE

BACKGROUND

This patent is directed to a spring assembly with a protected attachment site, a vibratory apparatus including a spring assembly with a protected attachment site, and a method for manufacturing a spring assembly with a protected attachment site.

In a two-mass vibratory apparatus, a first mass (or exciter mass) is attached to a second mass (e.g., trough) by one or more reactor springs. Often, these reactor springs are in the form of coil springs having an end loop disposed at either end. A washer is placed over one of the end loops, and a fastener (typically a bolt and nut pair) is disposed through the washer and the end loop to secure the coil spring to the first mass or to the second mass.

While reactor springs are conventionally coated with a corrosion-resistant and/or abrasion-resistant coating on the outer surface of the spring, such coatings can become compromised at the contact areas between the spring, the washer, the fasteners and the machinery. These compromised areas can lead to failure of the spring.

One solution has been to attach the reactor spring to the exciter and the trough, and then apply an additional coating over all of the assembled pieces. This additional coating is difficult and time-consuming to apply, and greatly increases the cost of the springs. In fact, it may not be possible to obtain full coverage of the potentially compromised areas, such that the additional coating does not prevent the failure of the spring at these areas.

It would be advantageous to overcome or substantially ameliorate one or more of the disadvantages of existing springs, or at least to provide a useful alternative.

SUMMARY

According to an aspect of the present disclosure, a spring assembly includes a coil spring having one or more helical coils between two longitudinally spaced ends, and an attachment site disposed at at least one of the longitudinally spaced ends. The attachment site includes a casing enclosing the at least one of the longitudinally spaced ends, the casing having a casing passage therethrough between a first side and a second side. The attachment site also includes a washer disposed on the first side and having a washer passage aligned with the casing passage, and a base disposed on the second side and having a base passage aligned with the casing passage.

According to another aspect of the present disclosure, a vibratory apparatus includes a deck, and an exciter assembly coupled to the deck, the exciter assembly comprising at least one eccentric mounted on a shaft, the shaft coupled to the deck with one or more spring assemblies. Each of the spring assemblies includes a coil spring having one or more helical coils between two longitudinally spaced ends, and an attachment site disposed at at least one of the longitudinally spaced ends. The attachment site includes a casing enclosing the at least one of the longitudinally spaced ends, the casing having a casing passage therethrough between a first side and a second side, a washer disposed on the first side and having a washer passage aligned with the casing passage, and a base disposed on the second side and having a base passage aligned with the casing passage.

According to a further aspect of the present disclosure, a vibratory apparatus includes a deck, an exciter assembly coupled to the deck, and one or more spring assemblies coupled to the deck to support the deck on a surface. Each of the spring assemblies includes a coil spring having one or more helical coils between two longitudinally spaced ends, and an attachment site disposed at at least one of the longitudinally spaced ends. The attachment site includes a casing enclosing the at least one of the longitudinally spaced ends, the casing having a casing passage therethrough between a first side and a second side, a washer disposed on the first side and having a washer passage aligned with the casing passage, and a base disposed on the second side and having a base passage aligned with the casing passage.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

DETAILED DESCRIPTION OF VARIOUS EMBODIMENTS

A spring assembly 100 according to one or more embodiments of the present disclosure is illustrated in FIGS. 1-5. The spring assembly 100 according to the embodiments illustrated in FIGS. 1-5 may be included as a reactor spring in one or more embodiments of a vibratory apparatus, such as the apparatus 200 illustrated in FIG. 6, and may be used in the operation thereof as explained below. As noted below, the spring assembly 100 may be used in other ways as well.

Figure 1:
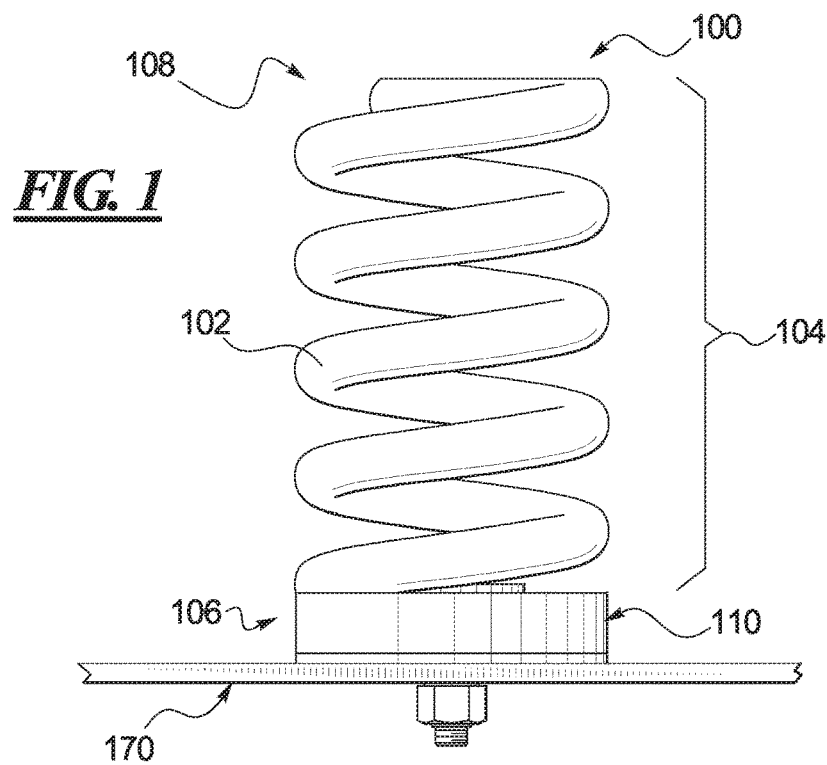
FIG. 1 is a side view of an embodiment of a spring assembly with a protected attachment site.

As illustrated in FIG. 1, the spring assembly 100 according to one embodiment includes a coil spring 102 having one or more helical coils 104 between two longitudinally spaced ends 106, 108. An attachment site 110, used to attach the spring assembly 100 to a vibratory apparatus such as, e.g., a classifier, conveyor, feeder or drum, is disposed at at least one of the longitudinally spaced ends 106, 108. As illustrated in FIG. 1, the attachment site 110 is disposed as the end 106.

Figure 2:
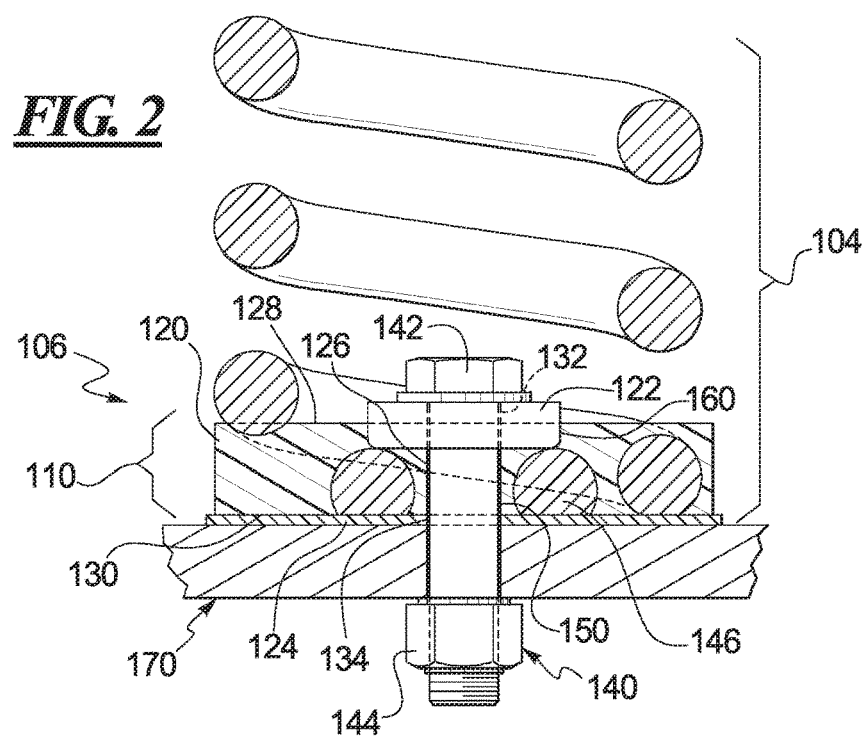
FIG. 2 is an enlarged cross-sectional view of the spring assembly of FIG. 1.

As seen in detail in the cross-section of FIG. 2, the attachment site 110 includes a casing 120, a washer 122, and a base 124. The casing 120 encloses the end 106 of the spring 102, and has a casing passage 126 therethrough between a first side 128 and a second side 130. The washer 122 is disposed on the first side 128 of the casing 120, and has a washer passage 132 aligned with the casing passage 126. The base 124 is disposed on the second side 130 of the casing 120, and has a base passage 134 aligned with the casing passage 126.

In this context, the washer 122 may be described as being disposed on the first side 128 of the casing 120 without the two objects being in direct contact (whether over all or only a portion of their facing surfaces). For example, an adhesive or sealing compound may be disposed between the facing surfaces of the casing 120 and washer 122, but the washer 122 may be described as disposed on the first side 128. Alternatively, the washer 122 may abut a portion of the end 106 of the spring 102 over a portion of its surface. The same is true relative to the base 124 and the second side 130.

Further, the passages 126, 132, 134 may be described as aligned without all three passages 126, 132, 134 having a common central axis. That is, each of the passages 126, 132, 134 has a central axis that extends through the center of the passage 126, 132, 134. Where all three passages 126, 132, 134 are generally cylindrical in nature, that central axis may run through the center of the circular cross-section of the passage 126, 132, 134. In certain preferred embodiments, it may be possible to arrange the passages 126, 132, 134 so that the central axes are the same. According to other embodiments, the axes may be offset from each other, and yet the passages may be referred to as aligned if they are arranged so that a fastener may be disposed therethrough.

In this regard, the spring assembly 100 may also include or may be used with a fastener 140 (see FIG. 2). As illustrated, the fastener 140 includes a bolt 142 and a nut 144, but a rivet or clamp may be used instead. The fastener 140 is disposed through the washer passage 132, the casing passage 126 and the base passage 134 at the attachment site 110 to secure the washer 122, casing 120, spring 102 and base 124 together. This fastener 140 may also be used to attach or secure the spring assembly 100 to the vibratory apparatus.

It will be recognized that the attachment site 110, and in particular the casing 120, washer 122 and base 124 form a multilayered shield that protects the end 106 of the spring 102. This multilayered shield may surround the end 106 of the spring 102 to limit or prevent materials in the surrounding environment, especially materials that would corrode (e.g., moisture) or abrade (e.g. grit, sand) the spring 102, from contacting the spring 102. According to preferred embodiments, the connection between the casing 120, the washer 122 and the base 124 may be fluid-tight (e.g., water-tight). In fact, the shield may also limit or prevent contact between the fastener 140 and the end 106 of the coil spring 102, to prevent any interaction between the end 106 and the fastener 140 that would cause abrasion or corrosion of the end 106. Moreover, certain embodiments of the attachment site 110 provide this multilayered shield as a unitary (i.e., one-piece) structure with the coil spring 102 to facilitate assembly of the spring assembly 100 with the apparatus on which it is to be mounted. As such, the spring assembly 100 may represent an economical alternative that may be reliably mass-produced and installed quickly and easily.

Having discussed the spring assembly 100 in general terms with reference to FIGS. 1 and 2, the details of the spring assembly 100 are now discussed in detail with reference to FIG. 3.

Figure 3:
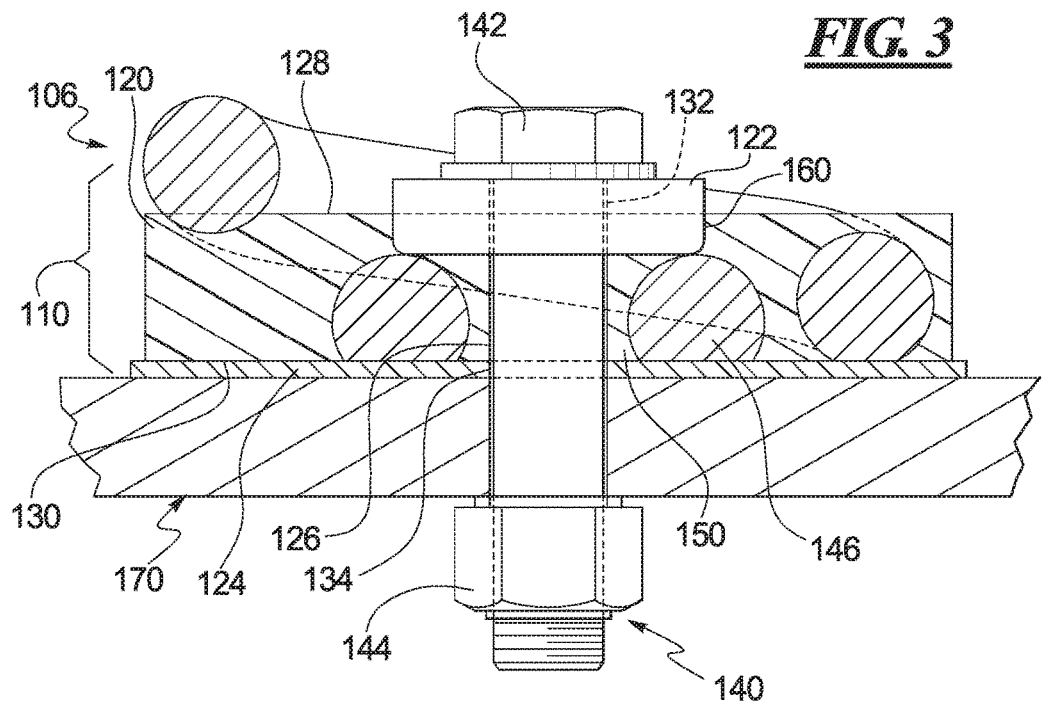
FIG. 3 is a further enlarged cross-sectional view of the spring assembly of FIG. 1.

As illustrated in FIGS. 2 and 3, the end 106 of the coil spring 102 includes a loop 146. The loop 146 is similar in structure to the loop 148 at the other end 108 of the spring 102. See, for example, FIG. 4. The fastener 140 may be received through the loop 146 to secure the coil spring 102 to the remainder of the machine.

The loop 146 is attached to the one or more helical coils 104, and is typically formed from the same piece of metal (e.g., steel) as the helical coils 104. The loop 146 defines a loop passage 150 (see FIG. 2 or 3) between the opposing internal surfaces of the loop 146 through which the fastener 140 is received. This passage 150 may also define the casing passage 126 according to certain embodiments. According to other embodiments, the casing 120 may be disposed (at least in part) in the loop passage 150, preferably with the portion of the casing 120 disposed in the loop passage 150 defining the casing passage 126 aligned with the loop passage 150.

As illustrated in FIGS. 2 and 3, by disposing the casing 120 in the loop 146 (i.e., the loop passage 150), the casing 120 may form a barrier between the fastener 140 and the loop 146. Besides potentially limiting or preventing contact between the fastener 140 and the loop 146, the casing 120 potentially limits or prevents contact between the fastener 140 and any materials that may be applied to an outer surface of the spring 102 to make the spring corrosion-resistant, for example. That is, the spring 102 may be coated with a corrosion-resistant material such as zinc phosphate. Preventing contact prevents this material from being removed by the fastener 140 during installation, or with relative motion of the parts during operation.

To further ensure that the loop 146 is protected or shielded, the casing 120 may enclose (or encapsulate) the loop 146. That is, the casing 120 may be formed to surround the loop 146 such that the casing 120 covers the substantial portion of the outer surface of the loop 146. For the casing 120 to be considered to enclose the loop 146 (or the end 106), the casing 120 need not surround the entire outer surface of the loop 146, as the washer 122 and the base 124 may be in direct contact (e.g., metal-to-metal contact) with at least a portion of the loop 146 according to certain embodiments. In some embodiments, the casing 120 may be in the form of a solid disc of material enclosing the loop 146. According to the illustrated embodiments, the casing 120 may enclose not only the loop 146 at the end 106, but at least a portion of the one or more helical coils 104 as well.

A number of materials may be used for the casing 120. According to certain embodiments, the casing 120 may be made of an elastomeric material. The casing 120 may be formed with the spring 102 by molding the casing 120 around the end 106 of the spring 102, preferably after a layer or multiple layers of a corrosion-resistant material is applied to the spring 102.

According to some embodiments, including those illustrated in FIGS. 2 and 3, the casing 120 may have at least a recess 160. The washer 122 is received within the recess 160. The recess 160 may assist in aligning the washer 122 with the loop 146, and in aligning the washer passage 132 with the casing passage 126 (and the loop passage 150). Alternatively, the recess 160 may be formed when the washer 122 is molded in place in the casing 120.

The recess 160 may depend or extend into the casing 120 a distance (or depth) parallel to the casing passage axis. Preferably, the recess 160 depends sufficiently into the casing 120 that the washer 122 abuts the outer surface of the loop 146. Where the washer 122 abuts or is in direct contact (e.g., metal-to-metal contact) with the loop 146, the casing 120 may seal against the washer 122 to prevent infiltration of materials along the casing 120/washer 122 interface (e.g., the parts may be adhesively bonded, or the washer 122 may be molded in place when the casing 120 is formed). According to other embodiments, the recess 160 limits or even prevents contact between the washer 122 and the outer surface of the loop 146. In fact, a portion of the casing 120 may be received between the washer 122 and the loop 146 in some embodiments.

According to certain embodiments, the washer 122 is made of a corrosion-resistant material, such as stainless steel or titanium, or a corrosion-resistant and/or abrasion-resistant material may be applied to an outer surface thereof. The washer 122 may be disposed in the recess 160, and the dimensions of the recess 160 and the washer 122 may be such that the washer 122 is secured or attached to the casing 120 (for example, as a consequence of the elastomeric material used in the casing 120). Alternatively or in addition, the washer 122 may be adhered to a surface on the first side 128 in the recess 160 of the casing 120 using an adhesive or as part of the manufacturing process used to form the first side 128.

Figure 4:
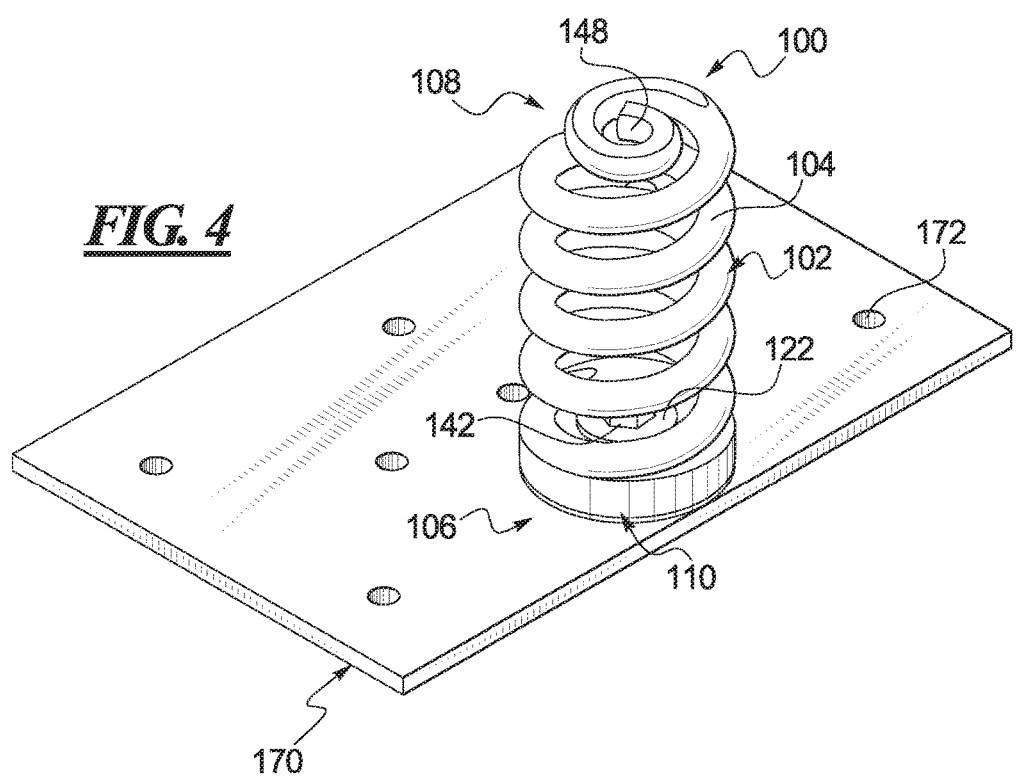
FIG. 4 is a perspective view of the spring assembly of FIG. 1.
Figure 5:
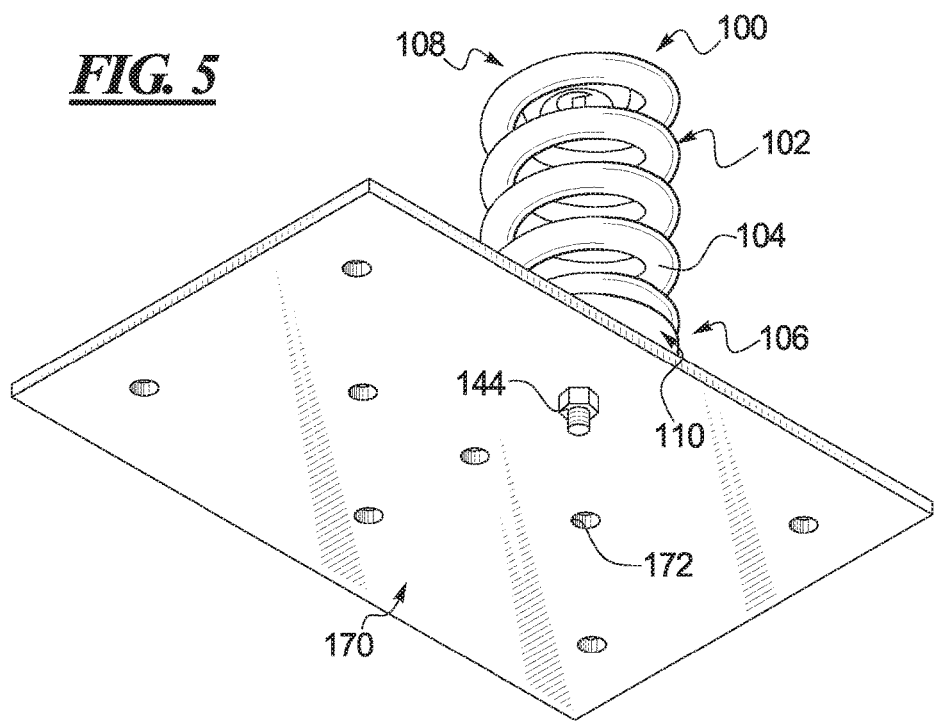
FIG. 5 is a perspective view illustrating the reverse side of the spring assembly of FIG. 1.

On the opposite side 130 of the casing 120 is the base 124. As illustrated in FIGS. 1, 4, and 5, the base 124 may have dimensions in the plane perpendicular to the longitudinal axis of the spring 102 (i.e., an axis that passes through both loops 146,148) that are similar or comparable to an inner or outer diameter of the coils 104 of the spring 102 (i.e., the base may be in the form of a flat annulus, with the outer diameter of the base 124 comparable to the outer diameter of the coils 104 of the spring 102). This need not be the case according to all embodiments. For example, according to an alternative embodiment, the base 124 may be much larger dimensionally than the spring 102 in the plane perpendicular to a longitudinal axis of the spring 102, and may have a rectangular or square shape instead of a circular shape.

According to the illustrated embodiment, the base 124 is in the form of a plate, substantially lying in a plane perpendicular to the longitudinal axis of the spring 102. In fact, according to certain embodiments, the base-plate 124 may be approximately 0.04 to 0.10 inches (1 to 2.5 mm) thick. Again, this need not be the case according to all embodiments. For example, the base 124 may have a bend or curvature, such that the base 124 is not two-dimensional, but three-dimensional. The base 124 may be slightly larger in diameter than the casing 120 and may have a recess formed therein to receive the remainder of the spring assembly 100 (e.g., the casing 120), for example to better ensure alignment of the remainder of the attachment site 110 and the base 124 to as to better ensure alignment of the casing passage 126 and the base passage 134.

Similar to the washer 122, the base 124 may abut or be in direct contact with the loop 146. Where the base 124 abuts or is in direct contact (e.g., metal-to-metal contact) with the loop 146, the casing 120 may seal against the base 124 to prevent infiltration of materials along the casing 120/base 124 interface. According to other embodiments, the casing 120 may fully surround the loop 146 such that a portion of the casing 120 is disposed between the loop 146 and the base 124.

The base 124 may be made of a corrosion-resistant material and/or abrasion-resistance material such as stainless steel or titanium, in a similar fashion as the washer 122. Alternatively, a corrosion-resistant and/or abrasion-resistant material may be applied to an outer surface of the base 124. In addition, the base 124 may be adhered to the second side 130 of the casing 120 to ensure that the attachment site 110 is a single, or unitary, structure. To this end, an adhesive such as silicone or polyurethane may be used, or the base 124 may be adhered (bonded) to the second side 130 during manufacture of the casing 120, and in particular the second side 130.

The spring assembly 100 may be attached to a spring seat 170. While the spring seat 170 is represented as a relatively thin plate in FIGS. 1, 4 and 5, the spring seat 170 is typically much thicker than the base 124: for example, the spring seat 170 may be 2 to 4 inches (5 to 10 cm) thick (see FIGS. 2 and 3). The spring seat 170 may have a plurality of holes 172 formed therethrough. Each of the holes 172 may define a passage that may be aligned with the passages in the attachment site 100 to permit the fastener 140 to be disposed therethrough. Thus, a plurality of spring assemblies 100 may be attached to a single spring seat 170 using the plurality of holes 172.

According to certain embodiments, more than one base 124 may be used. That is, while an embodiment has been illustrated where a single base 124 is disposed on the side 130 of the casing 120, it may be possible to dispose an additional base (or sub-base) between the base 124 and the spring seat 170 to which it is attached. This sub-base also preferably would be made of a corrosion-resistant and/or abrasion-resistant materials, or would have a corrosion-resistant and/or abrasion-resistant material applied to an outer surface thereof.

According to still further embodiments, an attachment site 110 may be disposed at each of the longitudinally spaced ends 106, 108. In such a circumstance, each of the attachment sites 110 would include a separate casing 120 enclosing one of the ends 106, 108. The casing 120 may have a casing passage 126 therethrough between a first side 128 and a second side 130. A washer 122 may be disposed on the first side 128 and may have a washer passage 132 aligned with the casing passage 126. Further, a base 124 may be disposed on the second side 130, and may have a base passage 132 aligned with the casing passage 126. Fasteners 140 may be disposed through the washer passages 132, the casing passages 126 and the base passages 132 at each attachment site 110 to secure the washer 122, casing 120, spring 102 and base 124 together.

Figure 6:
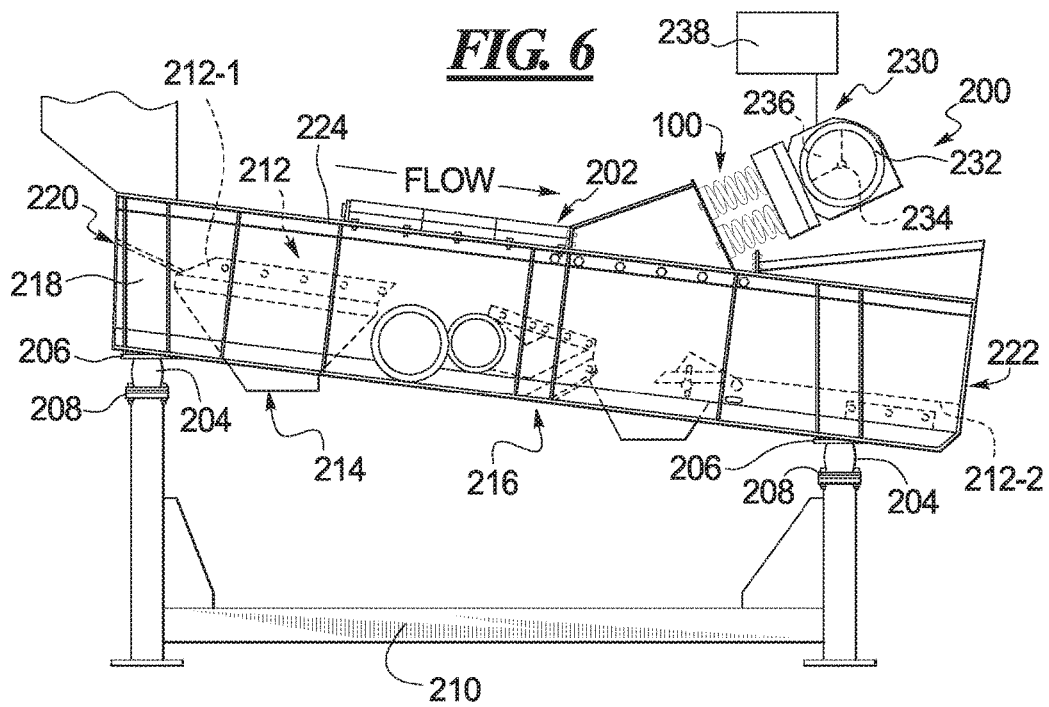
FIG. 6 is a side view of a vibratory apparatus incorporating a plurality of the spring assemblies of FIG. 1.

As mentioned above, the spring assembly 100 may be included as one of more of the reactor springs of a vibratory apparatus, one embodiment of which is illustrated in FIG. 6. In such an application, the vibratory apparatus may include a deck, and an exciter assembly coupled to the deck. The exciter assembly may include at least one eccentric mounted on a shaft, the shaft being coupled to the deck by one or more spring assemblies. Each of the spring assemblies may include a coil spring having one or more helical coils between two longitudinally spaced ends, and an attachment site disposed at at least one of the longitudinally spaced ends. The attachment site may include a casing enclosing the at least one of the longitudinally spaced ends, the casing having a casing passage therethrough between a first side and a second side, a washer disposed on the first side and having a washer passage aligned with the casing passage, and a base disposed on the second side and having a base passage aligned with the casing passage. A fastener may be disposed through the washer passage, the casing passage and the base passage at the attachment site to secure the washer, casing, spring and base together.

Having thus described the spring assembly as part of a vibratory apparatus in general terms, the structure of a vibratory apparatus and the integration of one or more spring assemblies in that vibratory apparatus are now discussed in detail in regard to the embodiment of the vibratory apparatus and the spring apparatus illustrated in FIG. 6.

FIG. 6 illustrates an embodiment of a vibratory apparatus 200, in the form of a separator or classifier. This embodiment is intended to be a non-limiting example of the possible apparatuses that may include a spring assembly 100 according to one or more of the embodiments described herein.

Embodiments of the vibratory apparatus may vary, for example, as to the function of the apparatus (e.g., conveyor, feeder, drum, etc.), the shape of the trough (e.g. linear trough, curved trough, cylindrical drum, etc.), the structures that support the trough and the manner of operation and structure of the exciter, as will be touched on briefly below.

As noted in the preceding paragraph, the apparatus 200 may include a trough 202 that is supported above a surface by a plurality of resilient members 204. According to certain embodiments (not illustrated), the resilient members 204 may be paired with linkages. The resilient members 204 (which may be referred to as isolation springs in this embodiment) may be attached at one end 206 to the trough 202 and at a second end 208 to a surface or ground, typically via a support structure or frame 210 that may be bolted or otherwise secured to the surface or ground. According to the illustrated embodiment, the isolation springs 204 may be marshmallow-type springs.

The trough 202 includes a deck 212, which deck 212 may be solid or may have one or more passages therethrough to permit materials of a first size to move over the deck 212 and of a second, smaller size to pass through the deck 212. The trough 202 may include a floor beneath the deck 212, or there may be an opening 214 in the trough 202 beneath the deck 212, as illustrated. Further, the deck 212 may include one or more deck sections 212-1, 212-2, which sections may be integrated with other equipment, such as an air knife 216 as illustrated.

The trough 202 may also include sidewalls 218 (one of which is illustrated) disposed at either side of the deck 212 between an inlet end 220 and an outlet end 222. The sidewalls 218 may be attached directly to the deck 212 at either side of the deck 212. According to certain embodiments, a hood 224 may be disposed above the deck 212 and attached to the sidewalls 218 to limit the amount of material that exits the apparatus 200 other than through the openings 214 below the deck 212 or out the outlet end 222.

An exciter 230 may be coupled to the trough 202 (e.g., by being connected or attached to the sidewalls 218), and thus be coupled to the deck 212. The exciter 230 may include a motor 232 having a shaft 234 to which one or more eccentric weights 236 are attached, for example. According to other embodiments, the exciter 230 may include pneumatic and/or hydraulic actuators instead of the motor 232. For that matter, the shaft 234 and weights 236 may be attached to the trough 202, while the motor 232 is coupled to the shaft 234, but not mounted on the apparatus 200.

The motor 232, shaft 234 and weights 236 (or simply shaft 234 and weights 236) may be coupled to the trough 202 via one or more of the spring assemblies 100, as illustrated, acting as reactor springs. The exciter 230 may cause motion of the trough 202 and associated deck 212, as well as motion of objects disposed on the deck 212. The exciter 230 may cause the objects to move from the inlet end 220 to the outlet end 222 (e.g., in a series of gentle catches and throws along a linear deck or in a rolling, tumbling motion along a curved deck), may cause the objects to move up and down without significant lateral motion relative to either end, or some combination thereof.

The operation of the exciter 230 may be controlled by a controller 238 that may be coupled to the exciter 230, particularly to the motor 232. The controller 238 may be programmable, and may vary the operation of the exciter 230.

It will be recognized that while the vibratory apparatus 200 may move the material from the inlet end 220 to the outlet end 222 according to the motion imparted to the trough 202 by the exciter 230, the apparatus 200 may include other equipment for moving or processing the material, as mentioned above. For example, the illustrated embodiment of the apparatus 200 includes an air knife 216, which may be used to separate the material as it moves from the inlet end 220 to the outlet end 222. Consequently, while the apparatus 200 is referred to as a vibratory apparatus, this should not be viewed as limiting the apparatus to the use of only vibratory action to process materials.

While different embodiments of the vibratory apparatus may vary from the illustrated embodiment of FIG. 6, it will be recognized that these embodiments still may have features in common with the illustrated embodiment. For example, certain vibratory apparatuses may have a trough with deck(s) and sidewalls, even if they have no hood. Other apparatuses will include the exciter, even if it is disposed below the trough instead of above. Still other apparatuses are supported from above, rather than being mounted on isolation springs supported on a surface or ground. As such, it may be possible to describe an embodiment of a vibratory apparatus that has fewer than all of the elements described for the illustrated embodiment of FIG. 6, but that still falls within the scope of this patent.

Figure 7:
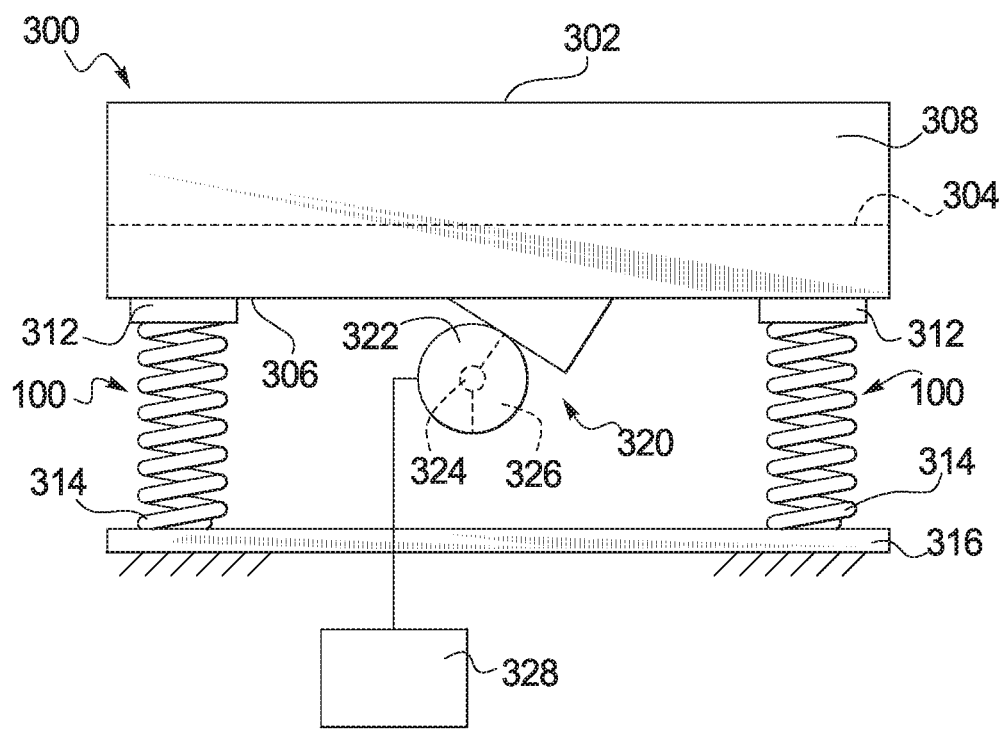
FIG. 7 is a side view of another vibratory apparatus incorporating a plurality of the spring assemblies of FIG. 1.

It is possible for the spring assemblies 100 to be used in a vibratory apparatus in other ways, instead of as reactor springs. For example, FIG. 7 illustrates a single-mass, or brute-force, apparatus (feeder) that utilizes a plurality of spring assemblies 100 in a different way: to support the deck of the apparatus on a surface or the ground, for example by being coupled at one end to the deck and at another end to a support structure, frame, or base that may be bolted or otherwise secured to the surface or the ground.

According to such an embodiment, the exemplary apparatus 300 may include a trough 302 with a deck 304, which deck 304 may be solid or may have one or more passages therethrough to permit materials of a first size to move over the deck 304 and of a second, smaller size to pass through the deck 304. The trough 302 may include a floor 306 beneath the deck 304, as illustrated. The deck 304 may be attached at either side to side walls 308 (one of which is illustrated in FIG. 7), which side walls 308 may also be attached to the floor 306.

The trough 302, and in particular the deck 304, may be supported above a surface or ground by a plurality of spring assemblies 100. The spring assemblies 100 (which may be referred to as isolation springs in this embodiment) may be attached at one end 312 to the trough 302 and at a second end 314 to a base 316, which base 316 may be bolted or otherwise secured to the surface or ground.

An exciter 320 may be coupled to the trough 302, and thus be coupled to the deck 304. The exciter 320 may include a motor 322 having a shaft 324 to which one or more eccentric weights 326 are attached, for example. According to other embodiments, the exciter 320 may include pneumatic and/or hydraulic actuators instead of the motor 322. For that matter, the shaft 324 and weights 326 may be attached to the trough 302, while the motor 322 is coupled to the shaft 324, but not mounted on the apparatus 300. A controller 328 may be included and coupled to the motor 322 to control operation of the motor 322.

Again, while different embodiments of the vibratory apparatus may vary from the illustrated embodiment of FIG. 7, it will be recognized that these embodiments still may have features in common with the illustrated embodiment. For example, certain vibratory apparatuses may have a trough with deck(s) and sidewalls, even if they have no floor. Other apparatuses will include the exciter, even if it is disposed below the trough instead of above. Still other apparatuses are supported using the spring assemblies 100 in combination with links or rocker arms. As such, it may be possible to describe an embodiment of a vibratory apparatus that has fewer than all of the elements described for the illustrated embodiment of FIG. 7, but that still falls within the scope of this patent.

It will also be recognized that the spring assembly according to one of the disclosed embodiments and/or a vibratory apparatus including one or more such spring assemblies may provide one or more of the following advantages. By surrounding the loop at the longitudinal end of the spring, contact between the loop and materials that might abrade or corrode the spring is limited or prevented. Further, by surrounding the loop at the longitudinal end of the spring, contact between the loop and materials that might remove any layer of corrosion-resistant material that may have been applied to the spring is limited or prevented. Moreover, where the casing entirely encloses or encapsulates the loop, contact may be further limited. In addition, where the position of the washer relative to the loop is ensured either by affixing the washer to the casing and/or by providing the casing with a structure to positively align the washer, the placement of the fastener through the spring loop may be simplified. In fact, where the parts of the attachment site (washer, casing and base) are affixed to each other, the installation of the spring assembly with protected attachment site may be simplified. Other advantages are also possible.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A spring assembly comprising:
a coil spring having one or more helical coils between two longitudinally spaced ends, and
an attachment site disposed at at least one of the longitudinally spaced ends,
the attachment site including a casing enclosing the at least one of the longitudinally spaced ends, the casing having a casing passage therethrough between a first side and a second side, a washer disposed on the first side and having a washer passage aligned with the casing passage, and a base disposed on the second side and having a base passage aligned with the casing passage
wherein the at least one of the longitudinally spaced ends defines a loop attached to the one or more helical coils, the washer abutting a first side of the loop and the base abutting a second side of the loop.

2. A spring assembly according to claim 1, further comprising a fastener disposed through the washer passage, the casing passage and the base passage at the attachment site.

3. A spring assembly according to claim 1, wherein the washer directly abuts the loop in metal-on-metal contact.

4. A spring assembly according to claim 1, wherein the base directly abuts the loop in metal-on-metal contact.

5. A spring assembly according to claim 1, wherein the casing encloses the loop.

6. A spring assembly according to claim 5, wherein the casing comprises a solid disc of material enclosing the loop.

7. A spring assembly according to claim 6, wherein the casing encloses the loop and at least a portion of the one or more helical coils.

8. A spring assembly according to claim 1, wherein the casing comprises an elastomeric material.

9. A spring assembly according to claim 1, wherein the casing has at least a first recess, the washer disposed in the first recess with the washer passage aligned with the casing passage.

10. A spring assembly according to claim 1, wherein the washer comprises a corrosion-resistant material.

11. A spring assembly according to claim 1, wherein the washer is adhered to the first side of the casing.

12. A spring assembly according to claim 1, wherein the base comprises a corrosion-resistant material.

13. A spring assembly according to claim 1, wherein the base is adhered to the second side of the casing.

14. A spring assembly according to claim 1, further comprising:
an attachment site disposed at each of the longitudinally spaced ends,
each of the attachment sites including a casing enclosing the at least one of the longitudinally spaced ends, the casing having a casing passage therethrough between a first side and a second side, a washer disposed on the first side and having a washer passage aligned with the casing passage, and a base disposed on the second side and having a base passage aligned with the casing passage.

15. A spring assembly according to claim 1, wherein the coil spring comprises a corrosion-resistant layer on an outer surface thereof.

16. A vibratory apparatus comprising:
a deck;
an exciter assembly coupled to the deck, the exciter assembly comprising at least one eccentric mounted on a shaft, the shaft coupled to the deck with one or more spring assemblies, each of the spring assemblies comprising a coil spring having one or more helical coils between two longitudinally spaced ends, and an attachment site disposed at at least one of the longitudinally spaced ends, the attachment site including a casing enclosing the at least one of the longitudinally spaced ends, the casing having a casing passage therethrough between a first side and a second side, a washer disposed on the first side and having a washer passage aligned with the casing passage, and a base disposed on the second side and having a base passage aligned with the casing passage.

17. The vibratory apparatus according to claim 16, wherein the at least one of the longitudinally spaced ends defines a loop attached to the one or more helical coils, the washer abutting a first side of the loop and the base abutting a second side of the loop.

18. A vibratory apparatus according to claim 17, wherein the washer directly abuts the loop in metal-on-metal contact.

19. A vibratory apparatus according to claim 17, wherein the base directly abuts the loop in metal-on-metal contact.

20. A vibratory apparatus comprising:
a deck;
an exciter assembly coupled to the deck; and
one or more spring assemblies coupled to the deck to support the deck on a surface, each of the spring assemblies comprising a coil spring having one or more helical coils between two longitudinally spaced ends, and an attachment site disposed at at least one of the longitudinally spaced ends, the attachment site including a casing enclosing the at least one of the longitudinally spaced ends, the casing having a casing passage therethrough between a first side and a second side, a washer disposed on the first side and having a washer passage aligned with the casing passage, and a base disposed on the second side and having a base passage aligned with the casing passage.

21. The vibratory apparatus according to claim 20, wherein the at least one of the longitudinally spaced ends defines a loop attached to the one or more helical coils, the washer abutting a first side of the loop and the base abutting a second side of the loop.

22. A vibratory apparatus according to claim 21, wherein the washer directly abuts the loop in metal-on-metal contact.

23. A vibratory apparatus according to claim 21, wherein the base directly abuts the loop in metal-on-metal contact.

* * * * *